US012789456B2

(12) United States Patent
Märklin

(10) Patent No.: US 12,789,456 B2
(45) Date of Patent: Nov. 10, 2026

(54) ARRANGEMENT AND METHOD FOR MANUFACTURING A PLURALITY OF ORTHODONTIC APPLIANCES

(71) Applicant: INSTITUT STRAUMANN AG, Basel (CH)

(72) Inventor: Lukas Märklin, Reinach (CH)

(73) Assignee: INSTITUT STRAUMANN AG, Basel (CH)

( * ) Notice: Subject to any disclaimer, the term of this patent is extended or adjusted under 35 U.S.C. 154(b) by 127 days.

(21) Appl. No.: 18/798,359

(22) Filed: Aug. 8, 2024

(65) Prior Publication Data

US 2024/0391170 A1 Nov. 28, 2024

Related U.S. Application Data

(63) Continuation of application No. 17/628,975, filed as application No. PCT/EP2020/070685 on Jul. 22, 2020, now Pat. No. 12,059,843.

(30) Foreign Application Priority Data

Jul. 23, 2019 (EP) .................................... 19187813

(51) Int. Cl.

| | |
|---|---|
| ***B29C 64/245*** | (2017.01) |
| ***A61C 7/08*** | (2006.01) |
| ***B29C 64/171*** | (2017.01) |
| ***B29C 64/393*** | (2017.01) |
| ***B33Y 10/00*** | (2015.01) |
| ***B33Y 30/00*** | (2015.01) |

(Continued)

(52) U.S. Cl.

CPC .............. *B29C 64/245* (2017.08); *A61C 7/08* (2013.01); *B29C 64/171* (2017.08); *B29C 64/393* (2017.08); *B33Y 10/00* (2014.12); *B33Y 30/00* (2014.12); *B33Y 50/02* (2014.12); *A61C 2204/005* (2013.01); *B33Y 80/00* (2014.12)

(58) Field of Classification Search

CPC . A61C 7/08; A61C 13/0019; A61C 2204/005; B33Y 30/00; B33Y 50/02; B33Y 10/00; B33Y 80/00; B29C 64/171; B29C 64/393; B29C 64/245

See application file for complete search history.

(56) References Cited

U.S. PATENT DOCUMENTS 6,976,627 B1 12/2005 Culp et al.
2013/0122448 A1 5/2013 Kitching (Continued)

OTHER PUBLICATIONS

PCT International Search Report for corresponding PCT Application No. PCT/EP2020/070685, mailed on Oct. 2, 2020—4 pages.

*Primary Examiner* — Monica A Huson

(74) *Attorney, Agent, or Firm* — Dority & Manning, P.A.

(57) ABSTRACT

The invention relates to an arrangement for manufacturing a plurality of orthodontic appliances in parallel, including an additive printing machine comprising a build platform and configured for additively manufacturing a plurality of teeth models in parallel, a plurality of plates each configured for teeth model printing by the additive printing machine, whereby each plate comprises a unique machine-readable identifier and each plate is detachable and precisely fixed to the build platform, and a thermoforming machine configured for thermoforming a thermoformable material over the plurality of teeth models for receiving the plurality of orthodontic appliances.

13 Claims, 3 Drawing Sheets

(51) Int. Cl.
*B33Y 50/02* (2015.01)
*B33Y 80/00* (2015.01)

(56) References Cited

U.S. PATENT DOCUMENTS

| | | | |
|---|---|---|---|
| 2014/0315153 | A1 | 10/2014 | Kitching et al. |
| 2018/0263730 | A1 | 9/2018 | Sirovskiy et al. |

ARRANGEMENT AND METHOD FOR MANUFACTURING A PLURALITY OF ORTHODONTIC APPLIANCES

CROSS-REFERENCE TO RELATED APPLICATIONS

The present application is a continuation of U.S. application Ser. No. 17/628,975, filed Jan. 21, 2022, which, in turn, claims the right of priority to U.S. national phase application of International Application No. PCT/EP2020/070685, filed Jul. 22, 2020, which, in turn, claims the right of priority to EP application Ser. No. 19/187,813.1, filed Jul. 23, 2019, the disclosures of which are hereby incorporated by reference herein in their entirety for all purposes.

FIELD OF INVENTION

The invention relates to an arrangement for manufacturing a plurality of orthodontic appliances in parallel, comprising an additive printing machine comprising a build platform and configured for additively manufacturing a plurality of teeth models or the plurality of orthodontic appliances in parallel. The invention further relates to a respective method for manufacturing the plurality of orthodontic appliances in parallel.

BACKGROUND

Orthodontic brackets such as so-called orthodontic appliances are interchangeable by a patient during treatment. A clinician may prescribe a series of orthodontic appliances, which are generally placed over but are not themselves adhesively secured or otherwise attached to a patient's teeth, to move one or more teeth from their original position to their aesthetically pleasing position. Typically, a series of orthodontic appliances is required to fully treat the patient because a degree of movement produced by a single orthodontic appliance is limited. As such, when used in a series, each orthodontic appliance in the series may be designed to fulfill a portion of the treatment process or move one or more teeth over a portion of the entire distance toward the desired position.

Orthodontic appliances are often fabricated by way of a physical and computer aided molding process, starting with forming an impression of the patent's dentition using a suitable impression material, such as polyvinylsiloxane (PVS). The impression is scanned by CT from which a computer creates a three-dimensional digital positive model of the patient's teeth and gingival. To create an orthodontic appliance to reflect the next desired tooth configuration in the series of treatment stages, a new three-dimensional model must be created that reflects the patient's dentition in the desired configuration, typically involving capturing shapes of the teeth in the three dimensional plaster model, or by using intra oral scan data to start such sequence without a physical impression and respective plaster model, into a computer aided design system. Then, in the computer aided design system, the teeth are separated by a computerized process, and then reset in the desired configuration. The resulting computerized model of the patient's dentition in a desired configuration is then used to print a physical model of that tooth configuration. Finally, typically clear plastic which will form the orthodontic appliance, such as a polyurethane, is molded over the physical model of the tooth configuration. Subsequent physical steps trim the molded orthodontic appliance to remove excessive material and/or sharp edges or portions which might contact and irritate the gingiva. In addition, the orthodontic appliance surface and edges are typically smoothed via a process such as tumbling.

Nowadays orthodontic appliances are often manufactured directly by additively manufacturing methods using layer-by-layer printing of a polymeric material for receiving a plurality of orthodontic appliances. However, handling of many orthodontic appliances printed in parallel in particular in respect to post-processing steps such as (laser) marking or CNC machining proves to be difficult. Thus, a needs exists to optimize such handling in an economical and time-optimized manner.

SUMMARY OF SOME EMBODIMENTS OF THE INVENTION

It is an object of the invention to provide an arrangement and a respective method for improving handling when manufacturing a plurality of orthodontic appliances in parallel.

The object is solved by the features of the independent claims. Preferred embodiments are described by the features of the dependent claims.

Thus, the object is solved by an arrangement for manufacturing a plurality of orthodontic appliances in parallel, comprising

- an additive printing machine comprising a build platform and configured for additively manufacturing a plurality of teeth models or the plurality of orthodontic appliances in parallel, and
- a plurality of plates each configured for teeth model printing or orthodontic appliance printing, respectively, by the additive printing machine, whereby each plate comprises a unique machine-readable identifier and each plate is detachable and precisely fixed to the build platform.

In a preferred implementation the additive printing machine is configured for additively manufacturing the plurality of teeth models, comprising a thermoforming machine configured for thermoforming a thermoformable material over the individual or a plurality of teeth models for receiving the plurality of orthodontic appliances.

It is therefore a key point of the invention to provide a plurality of plates, each comprising a unique machine-readable identifier, on which each one respective teeth model is printed. The plate therefore provides on one side identifiability of the respective teeth model or orthodontic appliance without the need to directly attach the identifier to the teeth model and on the other side simplifies handling of the teeth model respectively of the orthodontic appliance throughout the manufacturing process. Thanks to the plate the teeth model can be sufficiently precise processed on the build platform respectively by the additive printing machine as well as on the thermoforming machine or during subsequent post processing for example on a (laser) marking machine and/or a CNC machine, or by using a spinning process for reducing 3D printed material, by UV curing, cleaning etc., Such accurate positioning reduces respectively eliminates unwanted sharp edges or portions which might contact and irritate the gingiva, as said subsequent post-processing can be much more accurately carried out.

Additively manufacturing the plurality of teeth models in parallel shall be understood that the plurality of teeth models are manufactured at the same time in parallel or shortly each one after each other on the build platform. Thereby, the teeth models are printed on the plates, arranged on the build platform, for example by using layer-by-layer printing of a polymeric material. All teeth models may relate to a series of orthodontic appliances encapsulating up to fourteen teeth of a patient, and shaped to apply a load to at least one tooth that is sufficient to cause movement of the tooth, and remodeling of the adjacent bone. Such series of orthodontic appliances may be used to treat malocclusion of teeth, each directly manufactured orthodontic appliance used in series to incrementally move one or more teeth from initial positions toward a desired final position. Alternatively, the teeth models may relate to different series of orthodontic appliances. The teeth models may be formed of a single material, or may comprise layers of a first and a second polymeric material, each material forming part of the teeth model. In another alternative, a second teeth model, such as a stiffener, or an elastic member of wire or rubber, may be adhesively or otherwise joined to the directly manufactured teeth model. Preferably the teeth model is provided as an aligner model and/or the orthodontic appliance is provided as aligner.

The build platform is preferably provided as a rectangular means, for example as a flat sheet. Alternatively, the build platform may have a round shape or any other form that covers a full arch teeth model, such as a D-shape. Detachable and precisely fixed to the build platform means that the plate, in the fixed state, cannot be moved and is thus firmly attached to the build platform. The thermoformable material preferably comprises a thickness of 0.03 to 0.2 mm, preferably 0.05 to 0.08 mm, preferably measure prior to thermoforming, which, once applied, providing sufficient tensile strength and elasticity to retain original shape necessary to move teeth and retain position over a period of time. The thermoformable material may be provided as multilayer materials. Thermoforming by the thermoforming machine shall be understood as manufacturing process where the thermoformable material is heated to a pliable forming temperature, formed to the specific shape of the respective teeth model in a mold, and trimmed to create the orthodontic appliance. The thermoformable material, also referred to as film or sheet, is typically heated by heating elements to a high-enough temperature that permits it to be stretched into or onto a mold and cooled to a finished shape, for example by a so called Hamer thermoforming machines and/or a Biostar vacuum former.

According to a preferred implementation the plates are arranged on the build platform of the additive printing machine in a for example regular pattern thereby forming a matrix. The regular pattern may comprise an arrangement of 5 by 3 plates adjacent to each other. The plates can be provided as metallic even plates having a thin thickness such that by bending the plates the respective orthodontic appliance can be released from the respective plate and such that the respective plate moves back into its original position for re-using the respective plate. Preferably each one teeth model is printed on a respective plate. Such way a size of the plate corresponds preferably to a dimension of the teeth model. Besides that a single plate could be used to handle a plurality of teeth models, for example sub-batches of the teeth models.

In another preferred implementation the identifier comprises a RFID, a QR barcode, a machine readable text string, a bar code, and/or a magnetic stripe. RFID, radio-frequency identification, uses electromagnetic fields such that a RFID tag attached to the plate can be automatically identified and tracked. The RFID tag may contain electronically stored information, for example in regard to printing parameters of the orthodontic appliance. Passive tags collect energy from a nearby RFID reader's interrogating radio waves. Active tags have a local power source, such as a battery, and may operate hundreds of meters from the RFID reader. QR code, abbreviated from Quick Response Code, is a type of matrix barcode, or two-dimensional barcode. A barcode is a machine-readable optical label that preferably contains information about the model. A magnetic stripe stores information by modifying the magnetism of tiny iron-based magnetic particles of the stripe. Such way the identifier can be automatically read by a respective reader device and the read-out information may determine printing, thermoforming and/or subsequent post processing machining parameters.

According to a further preferred implementation the identifier is arranged on an opposite side and/or on the same side of the teeth model or orthodontic appliance, respectively on the plate and/or whereby additive printing takes place on the plate. The identifier is preferably attached to the plate, for example by using glue or screwed onto the plate. Such way the identifier can be exchanged from time to time. Attachment orientation is preferably chosen in respect to a location of a respective reader device.

In another preferred implementation the identifier comprises a RFID and/or a magnetic stripe and whereby the RFID and/or the magnetic stripe is provided within the plate. Providing the identifier within the plate provides the advantage that the identifier is protected against external influences such as dust or mechanical damages. Providing within the plate means for example that the identifier is completely encased by the plate and/or arranged within an interior of the plate.

Generally, various possibilities exist for detachably and precisely fixing the plate to the build platform, for ensuring precisely positioned printing, for example by using an adhesive tape, a holder clip and/or a Velcro. According to an in particular preferred implementation each plate and/or the build platform comprises a magnetic device and/or locking device for detachably and precisely fixing the plate to the build platform and/or whereby the build platform comprises negative forms for positioning a respective plate therein. The negative forms preferably correspond in their dimensions to the dimensions of the plates and/or are provided custom-fit to the plates. More preferably, the negative forms comprises clips or the like for detachably and precisely fixing the respective plates. The magnetic device is preferably provided such that every plate can be individually fixed to the build platform. The locking device may comprise mechanical and/or electrical means for detachably and precisely fixing the respective plates. Preferably, the negative forms are arranged in a matrix like manner such that the plates are positioned in a square like manner parallel and/or in alignment with each other.

In another preferred implementation the arrangement comprises a detection device configured for detecting the identifier and a position of each plate in respect to the build plate and whereby the additive printing machine is configured to controlling printing in respect to the detected identifier and position. The detection device may comprises an optical detection device, a camera, a RFID reader, a QR barcode reader, a bar code reader, and/or a magnetic stripe reader. The additive printing machine preferably comprises a computerized control device configured for analyzing identifier and/or position information received from the detection device by using a respective software and/or for subsequent controlling printing and/or post processing according to the red-out information. The computerized control device may comprise a database and/or a memory for storing identifier and/or position information, and/or related machining parameters.

According to another preferred implementation, the additive printing machine comprises a 3-dimensional, 3D, printing machine, a selective laser melting, SLM, printing machine, a selective laser sintering, SLS, machine and/or a stereolithography, SLA, printing machine. The term 3D printing, which is synonymously used with the term additive manufacturing or additive printing, generally covers a variety of processes in which material is joined or solidified under computer control to create a three-dimensional object, such as the teeth model, with material being added together, such as liquid molecules or powder grains being fused together, typically layer by layer. For manufacturing the teeth models respectively for receiving the orthodontic appliances, a variety of polymers may be used, such as commercially available Accura 60, Accura ClearVue, and RenShape 7870 as resin formulations. Other polymers that are transparent and designated as bio-compatible are, for example, FullCure 630 and FullCure 810, or WaterShed 11122, ProtoGen 18420, and BioClear. Preferably a non-transparent material is used, even if not biocompatible, as only the thermoformed orthodontic appliance needs to be biocompatible.

In another preferred implementation each plate comprises a positioning element configured for precisely fixating the plate to the build platform. The positioning element is preferably provided in respect to a geometry and/or shape of the plate. In a further preferred implementation the positioning element comprises a plurality of position holes, notches and/or outside forms of the plate. The positioning element allows for accurately positioning the plate in respect to the build platform. Preferably, in case the plate is provided with a rectangular shape, each one position hole, notch and/or outside form of the plate is associated to one of the edges of the plate.

In still another preferred implementation the arrangement comprises a CNC machine and/or a laser marking machine respectively comprising a connector base configured to precisely positioning at least one of the plates via the respective positioning element and/or wherein the thermoforming machine comprises the connector base configured to precisely positioning at least one of the plates via the respective positioning element. CNC, Computer Numerical Control, machining is preferably conducted in response to a digital teeth model segmented from a three-dimensional digital dental teeth plaster model, received by a computerized process. CNC based manufacturing may further include milling, stereo lithography, molding, and/or casting. CNC machining and/or laser marking allow for trimming the teeth model to remove sharp edges or portions which might contact and irritate the gingiva. In addition, the orthodontic appliance surface and edges can be smoothed via a process such as tumbling. Further post-processing techniques such as ultrasonic bath and tumbling with ceramic cones or silicon crystals might yield similar transparent qualities as the thermoformed orthodontic appliances. The connector base preferably correlates to the positioning element such that by placing and/or inserting the positioning element into or onto the connector base the plate and thus the orthodontic appliance is sufficiently precise fixed in respect to the CNC machine and/or the laser marking machine, thereby resulting in an accurate positioning for subsequent processing.

The object is further solved by a method for manufacturing a plurality of orthodontic appliances in parallel, comprising the steps of:

Providing a plurality of plates each configured for teeth model printing or orthodontic appliance printing by an additive printing machine and each plate comprising a unique machine-readable identifier, Detachably and precisely fixing the plates onto a build platform of the additive printing machine, and Manufacturing a plurality of teeth models or the plurality of orthodontic appliances, respectively, on the plates in parallel by the additive printing machine.

In another preferred implementation, the plurality of plates are each configured for teeth model printing by the additive printing machine, and the method comprises the step of:

Thermoforming a thermoformable material over the teeth models by a thermoforming machine for receiving the plurality of orthodontic appliances.

Due to the plate an accurate identifiability of the respective teeth model is provided without the need to directly attach the identifier to the teeth model, while the plate on the other side simplifies handling of the teeth model respectively of the orthodontic appliance in subsequent processing steps such as CNC machining, milling, water jet cutting and/or laser machining.

According to a preferred implementation, the method comprises the step of:

Arranging the plates on the build platform in a regular pattern thereby forming a matrix.

In another preferred implementation, the method comprises the step of:

Activating a magnetic device for locking the plates on the build platform.

According to a further preferred implementation, the method comprises the steps of:

Detecting the identifier and a position of each plate in respect to the build plate and Controlling printing in respect to the detected identifier and position.

In another preferred implementation, the method comprises the step of:

Positioning at least one of the plates with a positioning element of the plate into a connector base of a CNC machine and/or a laser marking machine for subsequent processing the plate according to the detected identifier in the respective machine, and/or Positioning at least one of the plates with the positioning element into the connector base of the thermoforming machine for subsequent processing the plate according to the detected identifier.

Further embodiments and advantages of the method can be derived by the person skilled in the art from the arrangement as described before.

Other example embodiments of the invention will be described in the following with reference to the figures. It has to be noted that the figures are only provided for illustration of the general concept of the invention by examples not defining the scope of protection of the invention. The figures are not drawn to scale. Features shall not be considered to be essential for the present invention because they are depicted in the figures.

BRIEF DESCRIPTION OF THE FIGURES

In the figures

DETAILED DESCRIPTION OF THE FIGURES

The invention will be described in the following with reference to an exemplary embodiment showing in FIG. 1 an arrangement for manufacturing a plurality of orthodontic appliances 1 in parallel according to an embodiment in a schematic perspective view.

Figure 1:
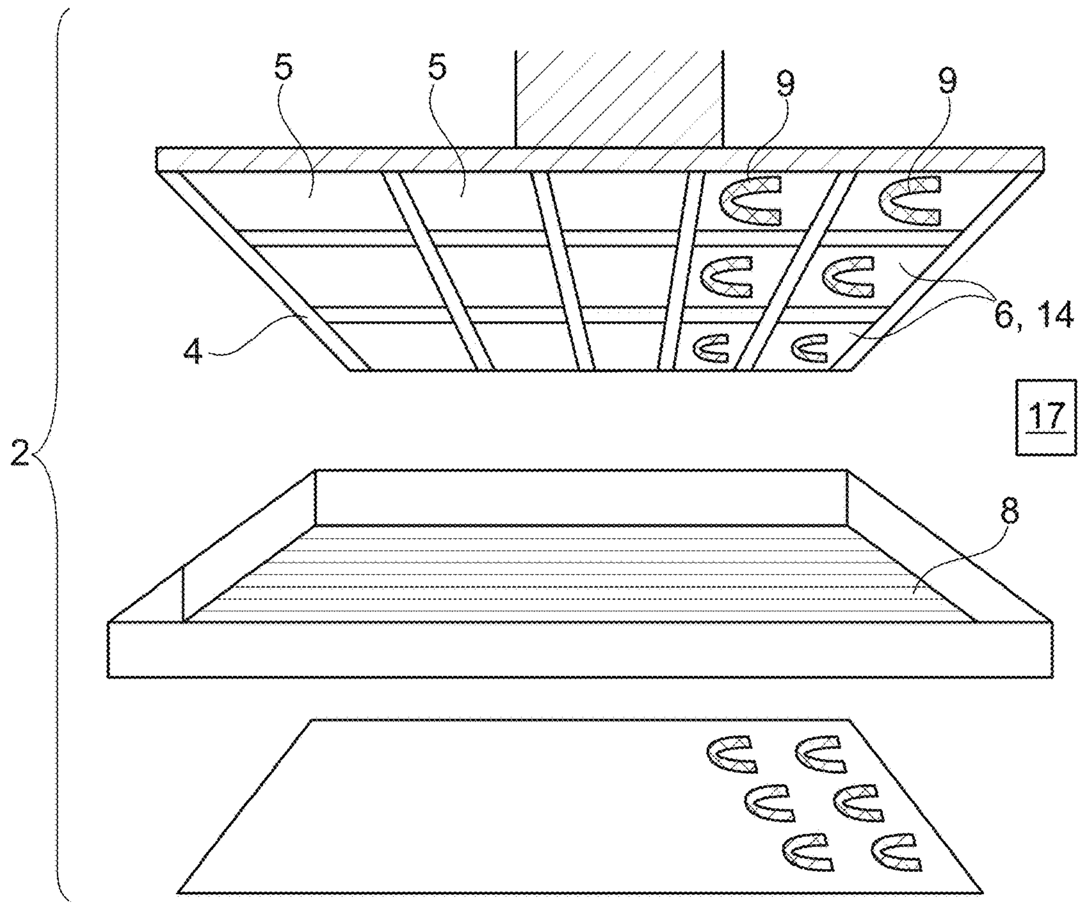
FIG. 1 shows an additive printing machine of an arrangement according to a preferred implementation in a schematic perspective view.

The arrangement comprises an additive printing machine 2 for additively manufacturing a plurality of teeth models 9 in parallel, only schematically depicted in FIG. 1. The additive printing machine 2 is provided as a 3-dimensional, 3D, printing machine. Alternatively, the additive printing machine 2 can be provided as a selective laser melting, SLM, printing machine, as a selective laser sintering, SLS, machine or as a stereo-lithography, SLA, printing machine.

The additive printing machine 2 comprises a rectangular build platform 4 with a 5 by 3 regular matrix of recessed portions 5, in which rectangular plates 6 can be inserted. The recessed portions 5 are negative forms 5 for positioning a respective plate 6 therein. In the embodiment shown in FIG. 1, the left 3 by 3 portions 5 are empty, whereas each one rectangular plate 6 is inserted in the right 2 by 3 portions 5. Such way the six plates 6 are arranged on the build platform 4 in a regular pattern, preferably thereby forming a matrix as well. The six plates 6 are each configured for teeth model printing by the additive printing machine 2, using a 3D printing resin 8 thereby resulting in six different teeth models 9, as can also be seen from the 3D printing screen optics shown in the bottom view of FIG. 1. In a subsequent processing step, shown in FIG. 3, a thermoforming machine 10 thermoforms a thermoformable material 11 over the plurality of teeth models 9 for receiving the plurality of orthodontic appliances 1. The plurality of orthodontic appliances 1 form a series of orthodontic appliances 1 to be worn by a single person, or may comprise different orthodontic appliances 1 to be worn by different persons.

Figure 3:
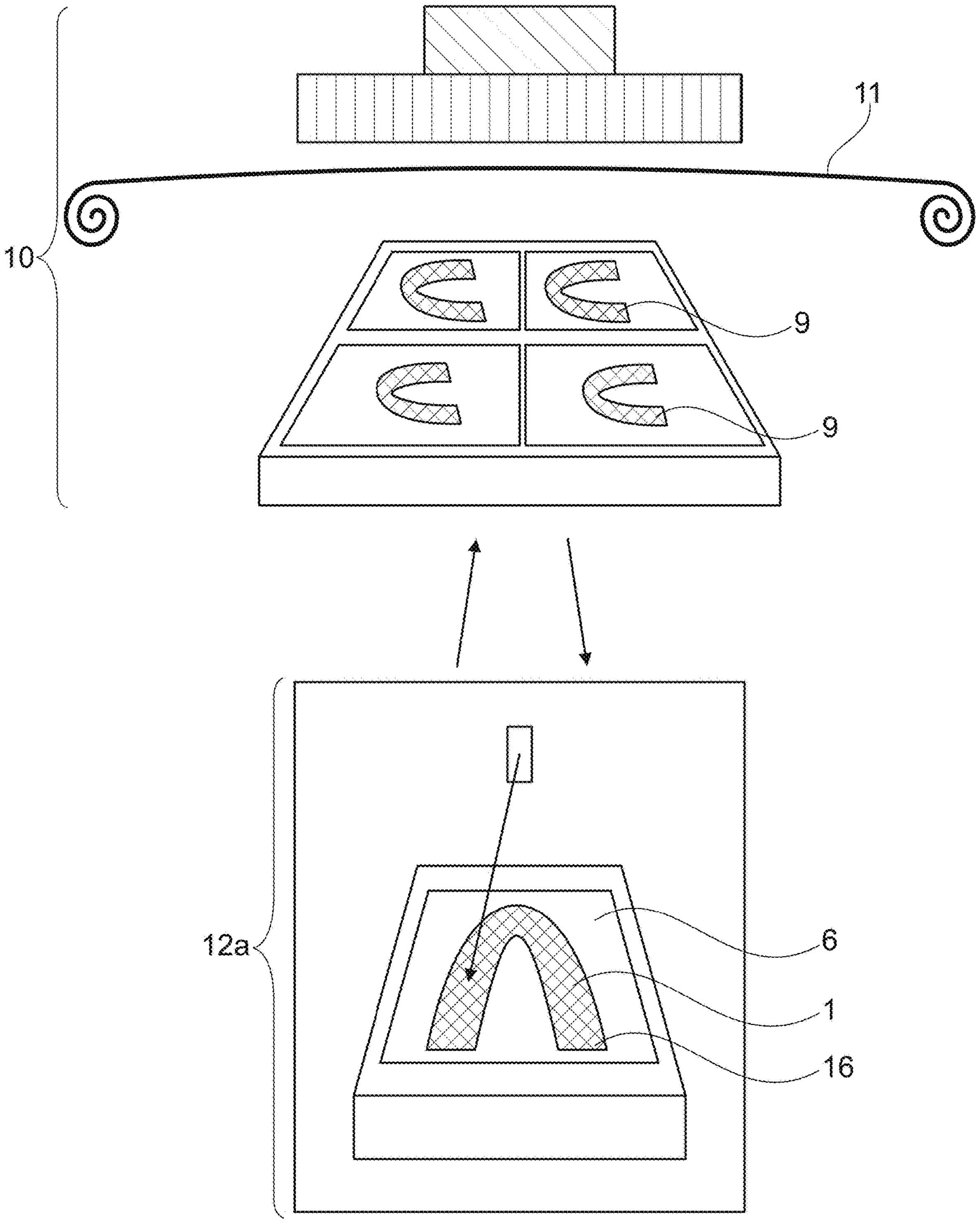
FIG. 3 shows a thermoforming machine and a laser marking machine of the arrangement according to the preferred implementation in a schematic perspective view.
Figure 4:
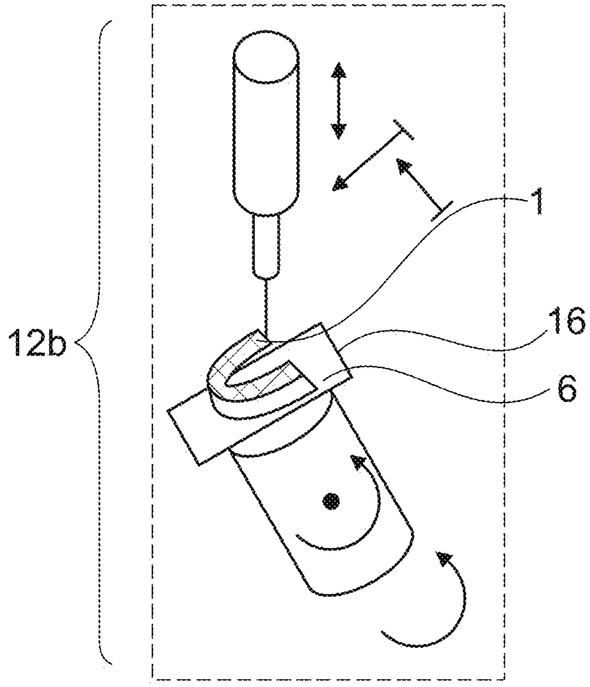
FIG. 4 shows a CNC machine according to the preferred implementation in a schematic perspective view.
Figure 5:
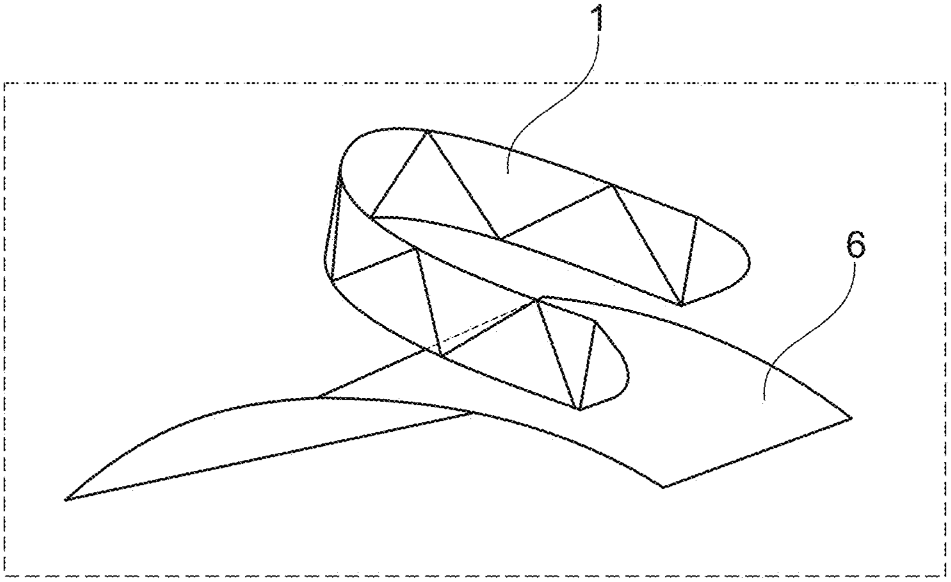
FIG. 5 shows an orthodontic appliance on the plate according to the preferred implementation.

In an optional processing step, the plurality of orthodontic appliances are individually processed by a laser marking machine 12*a* and/or a CNC machine 12*b*, shown in FIG. 4. FIG. 3 shows in its lower part such laser marking machine 12*a* carrying out laser marking on the orthodontic appliance 1 still provided on the plate 6. FIG. 4 shows the alternative or subsequent post processing of the orthodontic appliance 1 with the CNC machine 12*b*. Alternatively a milling machine and/or waterjet cutting could be employed for post processing the orthodontic appliance 1. For releasing the completely processed orthodontic appliance 1 from the plate 6, the plate 6 is manually bend thereby releasing the orthodontic appliance 1, as shown in FIG. 5. Once released, the plate 6 flips back in its original position and can be re-used for manufacturing another orthodontic appliance 1.

Figure 2:
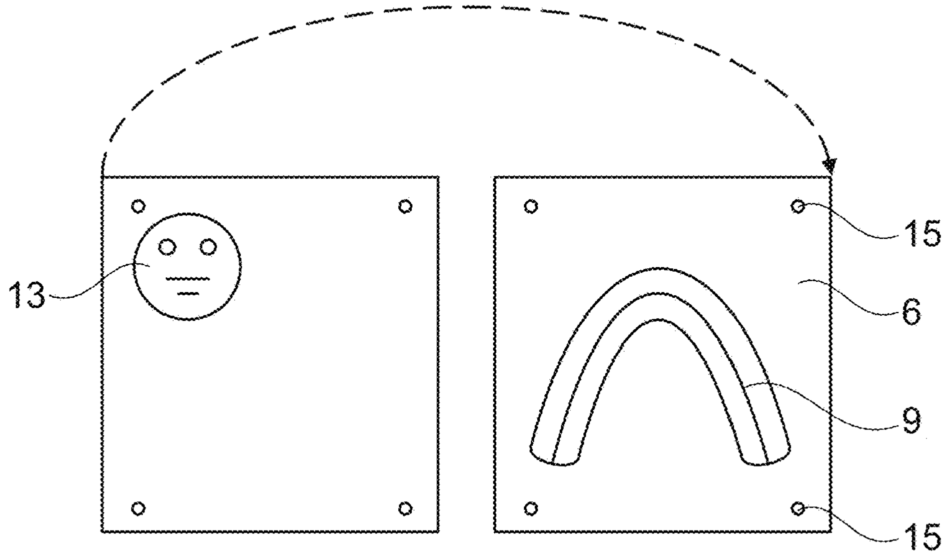
FIG. 2 shows a back side and a front side of a plate of the arrangement according to the preferred implementation.

Each of the plurality of plates 6 comprises a unique machine-readable identifier 13, as can be seen in FIG. 2, provided on the back side of the thin plate 6 and thus on the opposite side to the teeth model 9. The identifier 13 comprises a machine readable QR code respectively a barcode. Alternatively or in addition, the identifier 13 may comprise a RFID and/or a magnetic stripe, whereby the RFID and/or the magnetic stripe is provided within the plate 6 i.e. encapsulated within the plate 6. Due to the identifier 13 provided on and/or within the plate 6, each orthodontic appliance 1 can be accurately tracked throughout the complete manufacturing process.

Each plate 6 is detachable and precisely fixed to the build platform 4 by means of a magnetic device 14. Thus, by activating the magnetic device 14 a respective plate 6 is locked with the build platform 4 thereby allowing an accurate teeth model positioning and respective printing. For precisely positioning the plate 6 onto the build platform 4, each plate comprises a plurality of positioning elements 15, each provided as position holes and arranged at the edges of the rectangular plate 6. While not shown the positioning elements 15 may also comprise notches and/or outside forms of the plates 6.

Each the additive printing machine 2, the thermoforming machine 10 and the CNC machine 12*b* and/or the laser marking machine 12*a* comprise a respective connector base 16, provided as four distant pins corresponding to the position holes respectively positioning elements 15. Such way the plate 6 respectively the plates 6 can be precisely positioned by inserting the pins into the respective position holes, thereby allowing very precise post-processing of the teeth models 9 for receiving the orthodontic appliances 1.

The additive printing machine 2 further comprises an optical detection device 17 provided as camera and only schematically depicted in FIG. 1. The optical detection device 17 is configured for detecting the identifier 13 and a respective position of each plate 6 in respect to the build plate 4. The additive printing machine 2 is configured to controlling printing in respect to the detected identifier 13 and position.

For manufacturing the plurality of orthodontic appliances 1 in parallel, first the plurality of plates 6 are inserted into the respective recessed portions 5 respectively negative forms 5 of the build platform 4 such that the positioning elements 15 align with the connector base 16 thereby accurately position the plates 6 in respect to the build platform 4. Thereafter the plates 5 are fixed to the build platform 4 by activated the magnetic device 14. In a next step the plurality of teeth models 9 are printed on the plates 6 by the additive printing machine 2.

Thereby, the identifiers 3 of the respective plates 6 and the position of each plates 6 in respect to the build platform 4 is detected by the optical detection device 17 and printing with the additive printing machine 2 is controlled in respect to the detected identifier 13 and position of the plates 6 by a software running on the additive printing machine 2 and/or a computerized control device. The so printed teeth models 9 are then thermoformed with the thermoformable material 11 by the thermoforming machine 10 for receiving the plurality of orthodontic appliances 1. For post processing the orthodontic appliances 1, each one orthodontic appliance 1 or a plurality of orthodontic appliances 1 is positioned with the respective plate 6 or plates 6 into the connector base 16 of the CNC machine 12*b* and/or the laser marking machine 12*a*. Thereby, the respective plate 6 is identified by the respective identifier 13, and accordingly processed, for example as per predefined instructions stored in a database of the computerized control device and linked to the identifier 13.

It is to be understood that the described embodiments are examples only, which may be modified and/or supplemented in many ways within the scope of the claims. In particular, any feature described for a particular embodiment can be used by itself or in combination with other features in any other embodiment. Each feature that has been described for an embodiment of a particular category can also be used in an equivalent manner in an embodiment of any other category.

REFERENCE NUMERALS orthodontic appliance 1
additive printing machine 2
build platform 4
recessed portion, negative form 5
plate 6
resin 8
teeth model 9
thermoforming machine 10
thermoforming material 11
marking machine 12*a*
CNC machine 12*b*
identifier 13
magnetic device 14
positioning element 15
connector base 16
detection device 17

The invention claimed is:

1. A system for manufacturing a plurality of orthodontic appliances in parallel, comprising:
a build platform; and
a plurality of plates each configured for teeth model printing or orthodontic appliance printing, respectively, whereby each plate comprises a unique machine-readable identifier and each plate is detachable and precisely fixable to the build platform,
wherein each plate comprises a magnetic device and/or locking device for detachably and precisely fixing the plate to the build platform.

2. The system of claim 1, wherein the unique machine-readable identifier comprises an RFID tag.

3. The system of claim 2, wherein the RFID tag links to a database containing electronically stored information regarding printing parameters of the orthodontic appliance.

4. The system of claim 1, wherein the unique machine-readable identifier comprises a magnetic strip, a QR code, and/or a bar code.

5. The system of claim 1, wherein the teeth model printing or the orthodontic appliance printing is performed by an additive printing machine.

6. The system of claim 1, wherein the build platform includes a plurality of negative forms for positioning a respective plate therein.

7. The system of claim 6, wherein at least one of the plurality of negative forms further comprises one or more pins configured to engage with positioning elements of the plates.

8. A system for manufacturing a plurality of orthodontic appliances in parallel, comprising:
a build platform; and
a plurality of plates each configured for teeth model printing or orthodontic appliance printing, respectively, whereby each plate comprises a unique machine-readable identifier and each plate is detachable and precisely fixable to the build platform,
wherein the build platform comprises a magnetic device and/or locking device for detachably and precisely fixing the plate to the build platform.

9. The system of claim 1, wherein additive printing takes place on the plate.

10. The system of claim 1, wherein the system further comprises a detection device configured for detecting the identifier and a position of each plate with respect to the build platform.

11. The system of claim 1, wherein the system further comprises a positioning element configured for precisely fixating the plate to the build platform.

12. The system of claim 11, wherein the positioning element comprises a plurality of position holes, notches, and/or outside forms of the plate.

13. A method of manufacturing a plurality of orthodontic appliances in parallel, comprising:
providing a plurality of plates each configured for teeth model printing or orthodontic appliance printing, and each plate comprising a unique machine-readable identifier;
detachably fixing the plates onto a build platform;
activating a magnetic device for locking the plates on the build platform;
detecting the identifier and a position of each plate with respect to the build platform, wherein the identifier comprises an RFID tag containing electronically stored information regarding printing parameters of the teeth model or orthodontic appliance; and
controlling printing according to the electronically stored information and the position of each plate.

* * * * *